United States Patent [19]

Aldred

[11] Patent Number: 4,711,072
[45] Date of Patent: Dec. 8, 1987

[54] GRASS CUTTING ATTACHMENT FOR TRACTOR

[75] Inventor: Edward J. Aldred, Ipswich, England

[73] Assignee: Ransomes Sims & Jefferies PLC, Ipswich, England

[21] Appl. No.: 819,852

[22] Filed: Jan. 17, 1986

[30] Foreign Application Priority Data

Jan. 18, 1985 [GB] United Kingdom ............... 8501269

[51] Int. Cl.⁴ ..................... A01D 34/24; A01D 34/06
[52] U.S. Cl. ........................................ 56/6; 56/15.9; 56/16.2
[58] Field of Search ............... 56/6, 7, 15.5, 16.2, 56/15.2, 15.8, 15.9, 15.7, 16.3; 280/760, 763.1, 764.1, 765.1, 766.1; 180/900

[56] References Cited

U.S. PATENT DOCUMENTS

| | | | |
|---|---|---|---|
| 2,259,553 | 10/1941 | Clapper | 56/7 |
| 2,936,561 | 5/1960 | Grimes | 56/7 |
| 3,100,654 | 8/1963 | Hunter | 280/412 |
| 3,177,638 | 4/1965 | Johnson | 56/7 |
| 3,236,034 | 2/1966 | Blettner | 56/6 |
| 3,248,864 | 5/1966 | Barth | 56/7 |
| 3,360,054 | 12/1967 | Chilstrom | 172/274 |
| 3,429,109 | 2/1969 | Heth et al. | 56/7 |
| 3,616,626 | 11/1971 | Bramley et al. | 56/7 |
| 3,668,844 | 6/1972 | Akgulian et al. | 56/7 |
| 3,824,772 | 7/1974 | Sorenson et al. | 56/7 |
| 4,120,136 | 10/1978 | Rose | 56/15.8 |
| 4,297,830 | 11/1981 | Dufner | 56/6 |
| 4,501,111 | 2/1985 | Abbott | 56/8 |

FOREIGN PATENT DOCUMENTS 1245269 9/1971 United Kingdom .
2033720 5/1980 United Kingdom .

*Primary Examiner*—Stephen J. Novosad
*Assistant Examiner*—Bruce M. Kisliuk
*Attorney, Agent, or Firm*—Browdy and Neimark

[57] ABSTRACT

A grass cutting attachment for use particularly with compact tractors has a mounting frame, two cutting units lying behind the tractor front wheels and respective support arms which extend from a forward part of the frame rearwardly over the tractor front wheels to support the cutting units. The support arms are pivotal about inclined axes so that the cutting units may be lifted and simultaneously brought sideways into the tractor to reduce overall width. The cutting units are mounted for rocking movement relative to the support arms about fore and aft axis, these axis becoming inclined in the lifted position so that each unit is tilted forwardly and upwardly to improve operator access.

10 Claims, 6 Drawing Figures

GRASS CUTTING ATTACHMENT FOR TRACTOR

BACKGROUND OF THE INVENTION

This invention relates to grass cutting attachments for tractors.

One common form of grass cutting attachment provides one cutting unit in front of each tractor rear wheel, with the remaining one or more cutting units carried behind the tractor on the three point linkage. Such an arrangement has the advantage over the alternative of mounting all units behind the tractor, that grass is cut before being flattened by the tractor rear wheels. The two cutting units which are positioned between the front and rear tractor wheels are usually carried on lift arms which are in turn supported from beneath the tractor chassis.

There is now a demand for grass cutting attachments suitable for mounting on so-called compact tractors. With these smaller tractors, there is less room available beneath the tractor chassis for support structures and less ground clearance for lift arms. It is therefore one object of this invention to provide an improved grass cutting attachment which is better suited for mounting on smaller tractors.

With three unit grass cutting attachments for compact tractors, it is particularly important that the wing cutting units should bold to a transport position of reduced overall width. A cutting unit which projects a substantial lateral distance in a transport position is often a more acute problem with compact tractors because of the relatively greater size of the cutting unit as compared with the tractor. With some presently available grass cutting attachments, the cutting units can be moved to an upright transport position but still project a significant distance laterally. Moreover, in the transport position they severely restrict access to the tractor driving position.

It is an object of certain aspects of this invention to produce an improved grass cutting attachment in which these difficulties are removed or reduced.

SUMMARY OF THE INVENTION

The present invention consists in one aspect in a grass cutting attachment, comprising a frame adapted for fixed mounting to a tractor with a frame part positioned forwardly of the tractor front axle; two support arms each pivotally mounted at one end thereof to the frame at a location therein forwardly of the tractor front axle part and carrying at the other end a cutting unit, the support arms extending rearwardly past the tractor front axle to position the associated cutting units between front and rear tractor wheels, the arrangement being such that pivotal movement of each support arm relative to the frame effects bodily movement of the associtaed cutting unit from the ground.

Advantageously, each cutting unit is pivotal with respect to the associated support arm about an axis which in the cutting position lies in the direction of movement of the tractor such that, after lifting of the cutting unit through pivotal movement of the support arm, rotation of the cutting unit about said axis serves to bring the cutting unit to a transport position of reduced overall width.

Suitably, said axis is rearwardly and upwardly inclined in the lifted position of the support arm whereby the cutting unit is upwardly and forwardly inclined in the transport position.

Preferably, the pivotal mounting of each support arm to the frame part comprises a pivotal bearing axis which is inclined to the transverse direction such that pivotal movement of the support arm serves to move the cutting unit both upwardly and inwardly of the tractor.

DESCRIPTION OF THE PREFERRED EMBODIMENT

The invention will now be described by way of example with reference to the drawings.

Figure 1:
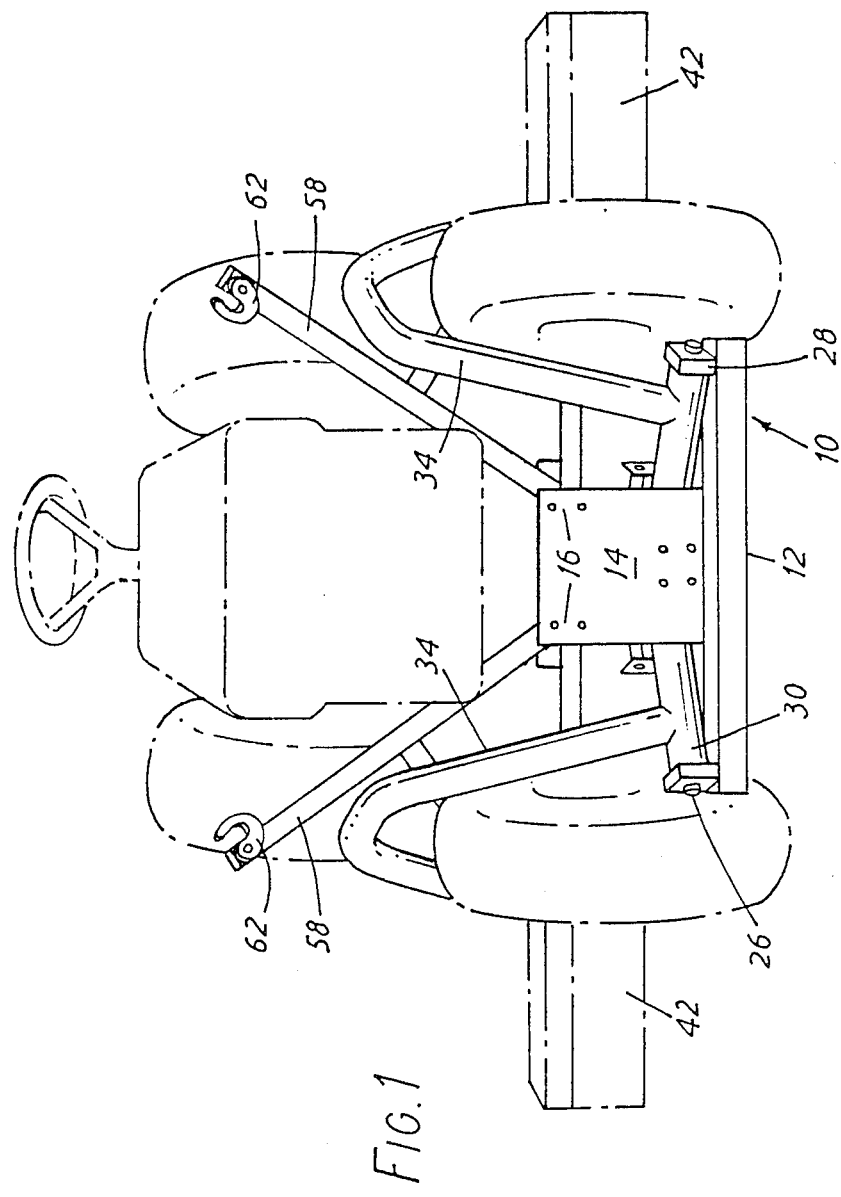
FIG. 1 is a front view of a grass cutting attachment according to this invention, mounted on a compact tractor, the tractor being shown in dotted outline.
Figure 2:
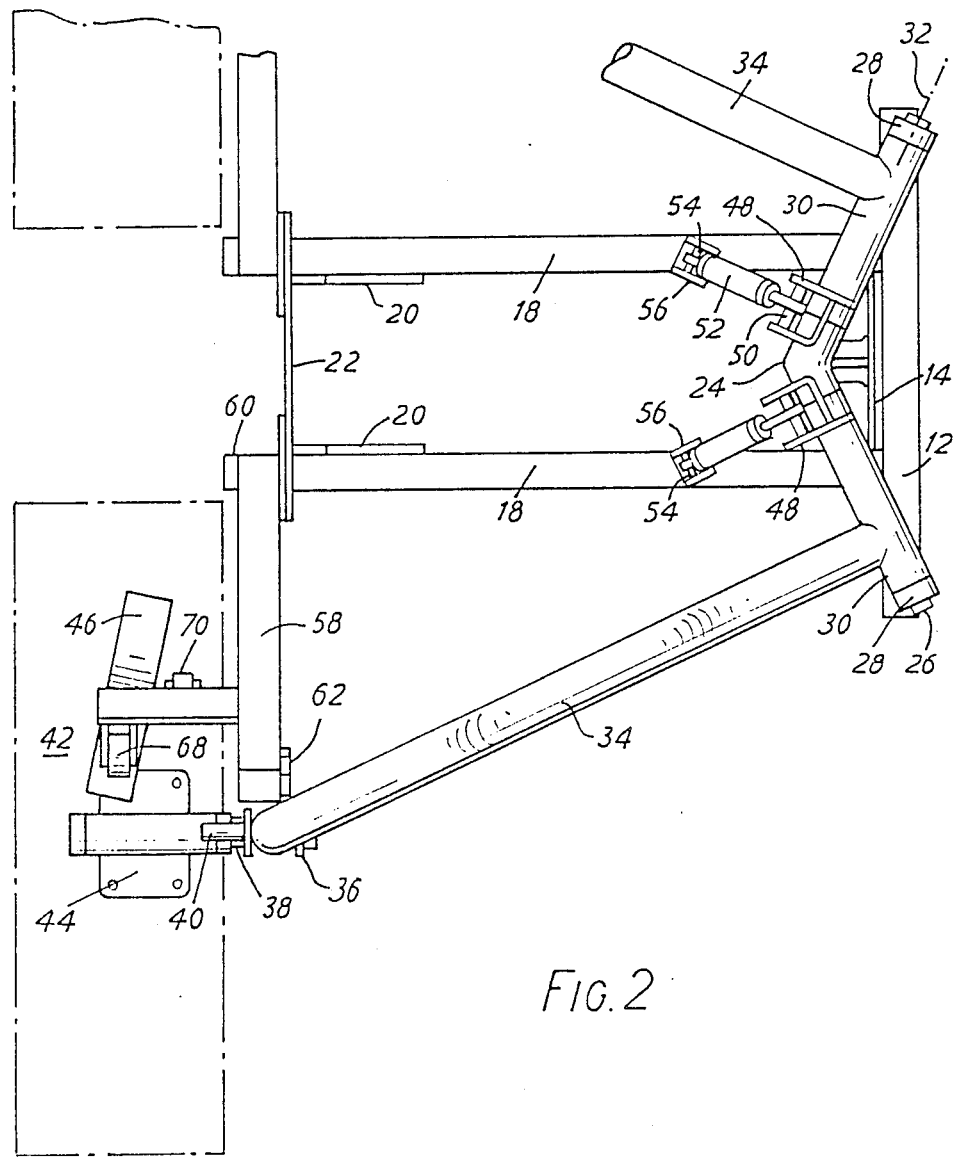
FIG. 2 is a plan view of the grass cutting attachment alone.

Referring to FIGS. 1 and 2, the attachment shown generally at 10 comprises a front bar 12 rigidly secured to an upstanding front plate 14 of rectangular form. The front plate is provided with four bolt holes 16 to enable mounting on the tractor chassis. A pair of side frame members 18 extend from the front bar 12 longitudinally beneath the tractor chassis and, towards their rear ends, are secured to the chassis through side mounting plates 20. The rear ends of the side frame members 18 are joined through a trnasverse rear frame member 22.

Figure 3:
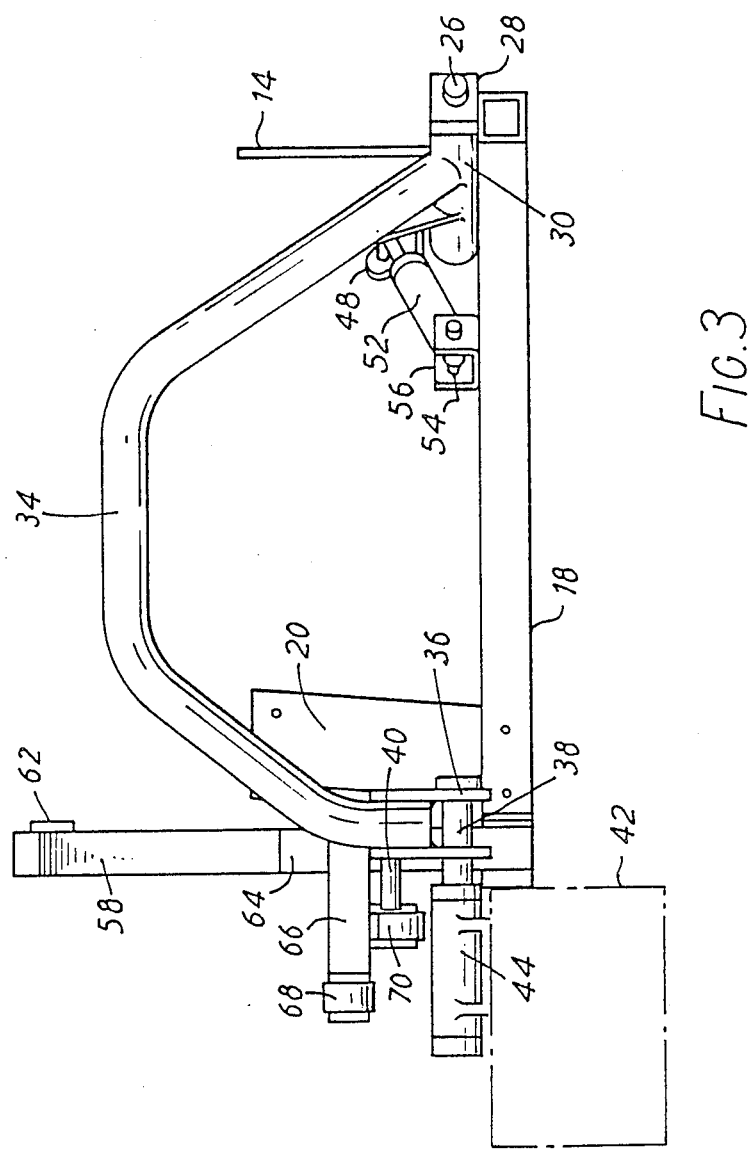
FIG. 3 is a side view of the grass cutting attachment alone.
Figure 4:
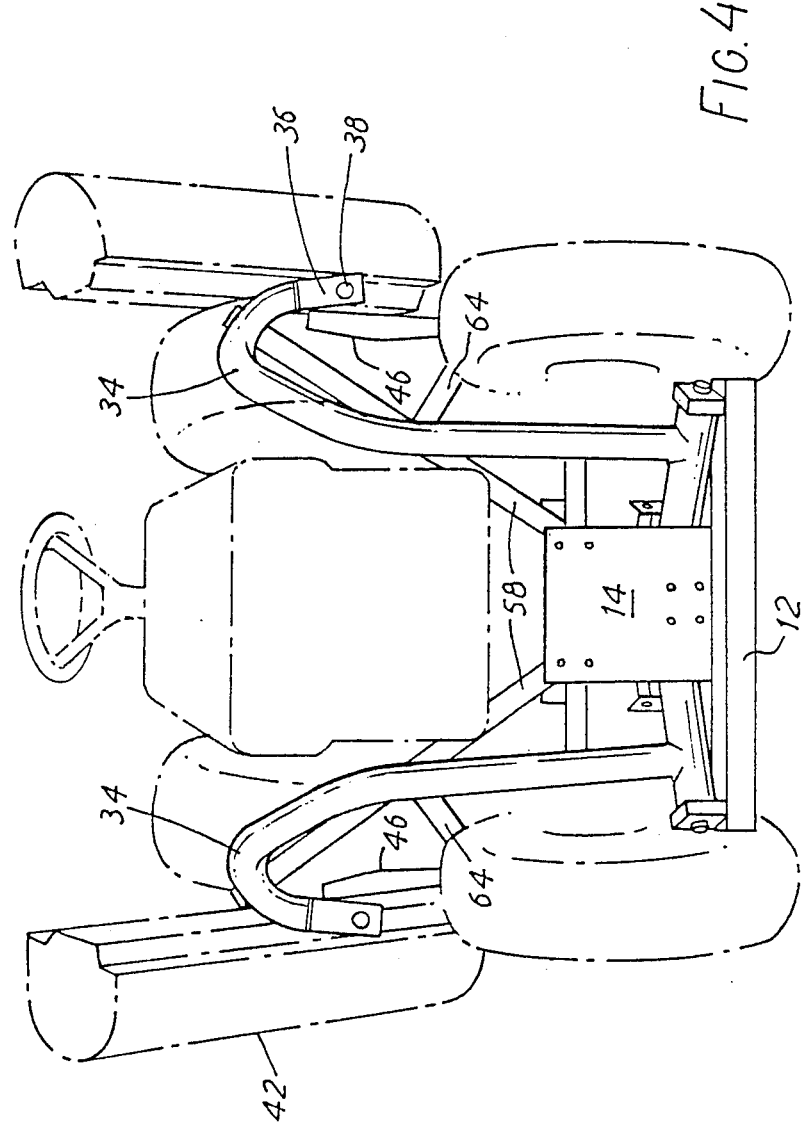
FIG. 4 is a front view similar to FIG. 1 but with the cutting units shown in a transport position.

Behind the front plate 14 there is bolted a bearing block 24 of generally V-shaped configuration. Pivot shafts 26 extend forwardly and outwardly from opposite ends of the bearing block. The pivot shafts are supported at their outer ends in respective collars 28 which are secured to the front bar 12 at the appropriate angle. A bearing sleeve 30 is carried on each pivot shaft for rotation about the forwardly and outwardly inclined axis shown at 32. A substantial, tubular mounting arm 34 is formed integrally with each bearing sleeve, each mounting arm being of bowed configuration. Each mounting arm extends rearwardly and outwardly over the corresponding front tractor wheel. At the free end of each mounting arm there are carried spaced ears 36 (best seen in FIG. 3) which are apertured to support a cutter mounting shaft 38 extending in the fore and aft direction. The rearmost ear 36 carries a short pin 40 extending parallel to the shaft 38; the purpose of this pin will be described later. Each cutting unit shown generally at 42 is provided on its upper surface with a bearing block 44 receiving the shaft 38. In this way, the cutting units are supported from the mounting arms and are capable of rocking movement relative to the support arms about the direction of movement of the tractor. The cutting units 42 are generally conventional cylinder units with hydraulic motors at their inward ends and need not be discussed in detail. They include, however, a track 46 (best seen in FIG. 2) secured to the upper surface inwardly of the bearing block 44 and the purpose of this track will be described later.

Each bearing sleeve 30 is formed with an integral flange 48 of approximately the same angular orientation relative to axis 32 as the mounting arm 34. A pin 50 carried in an aperture of the flange supports one end of a hydraulic ram 52 the other end of which is connected, through pin 54, with an angled clevis 56 secured to the corresponding side frame member 18.

Support posts 58 extend upwardly and outwardly from either end of the rear frame member 22. A bracket 60 is provided for direct connection of each mounting post 58 with the tractor chassis for additional bracing. At the top of each support post 58 there is provided a pivoting hook 62 which, in the transport position of the cutting unit can be engaged with the pin 40. Intermediate its length, each mounting post is formed integrally with an orthogonal leg 64 carrying a roller support beam 66 extending in the direction of movement of the tractor. Upper 68 and lower 70 rollers are mounted on the support beam for free rotation relative thereto.

Figure 5:
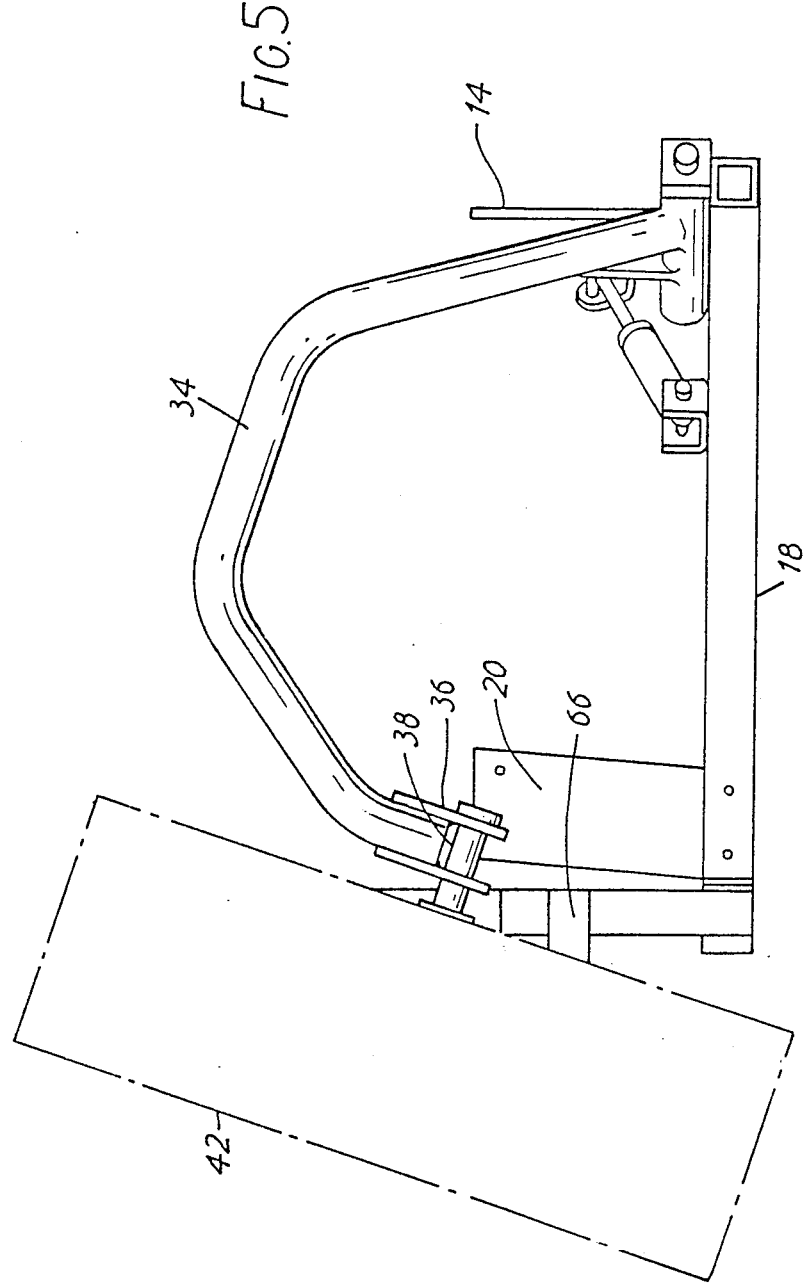
FIG. 5 is a side view similar to FIG. 3 but with the cutting units shown in a transport position.

During normal cutting operations, each cutting unit 42 follows the ground contours, such movement being accommodated by rocking movement about the cutter mounting shafts 38 or limited pivotal movement of the mounting arm about the pivot axis 32. When it is desired to lift one or both cutting units to the transport position, the hydraulic ram 52 is extended to rotate the mounting arm upwardly about the pivot axis 32. Since this axis is inclined to the transverse direction, the free end of the mounting arm moves not only upwardly but also inwardly. During this movement, the lower roller first engages the upper surface of the cutting unit causing the unit to begin to rotate about the mounting shaft in the sense to bring its outward end upward. As the lifting of the mounting arm and the rotation of the unit about shaft 38 continue, the upper roller engages the track 46 causing further rotation. The track 46 is contoured in the manner of a ski-jump with a curvature that decreases from the inner end of the unit to the mounting shaft. In this way, a smooth rotation about the shaft is effected and excessive demands upon the lifting ram avoided. At the completion of movement of the mounting arm, the free end has moved upward and inward to a position in which the hook 62 may be engaged around the pin 40 to secure the unit in the transport position. Through the action of the rollers 68 and 70, the cutting unit has been moved into substantially a vertical plane. It should be noted, however, that because of the movement of the mounting arm, ths shaft 38 is no longer lying in the direction of movement of the tractor but is upwardly and rearwardly inclined. Having moved through 90° relative to this shaft, the cutting unit is therefore inclined upwardly and forwardly relative to the tractor (as best seen in FIG. 5). This has the most useful consequence that not only has the cutting unit been brought inwardly of the tractor but also the forward inclination of the unit allows easy access of the tractor driver to the driving position.

Because each cutting unit is supported from a mounting arm which extends over the front wheel to a mounting position forwardly of the front axle, the attachment according to this invention can be used for compact tractors where the available space between the tractor wheels and beneath the chassis is severely restricted. Some mounting to the tractor may still be required between the wheels but space need not be found for the support arms or lifting rams.

Figure 6:
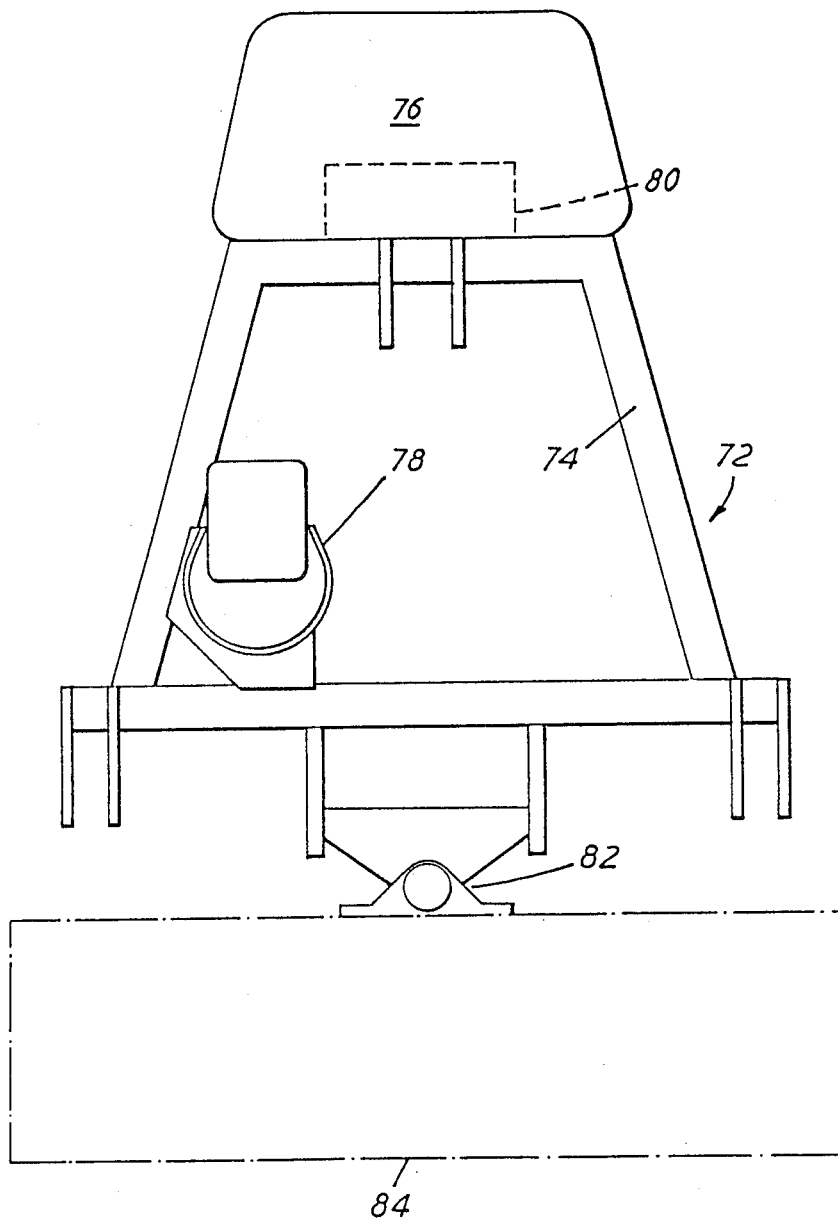
FIG. 6 is a rear view showing an additional attachment for mounting on the tractor three point linkage.

In the basic form, the described grass cutting attachment is supplemented by a third cutting unit assembly, as shown generally at 72 in FIG. 6, which can be mounted on the tractor three point linkage. The details of the third cutting unit assembly form no part of this invention and need not be fully described. Briefly, there is provided a frame 74 supporting a hydraulic fluid reservoir 76, a pump 78 connectable to the tractor PTO and a suitable hydraulic valve assembly 80. An arm 82 projects beneath the frame 74 to support the third cutting unit 84, there being provided means (not shown) for rotation the arm relative to the frame so as to lift the third unit from the ground. The pump 78 and valve gear assembly 80 are connected to the hydraulic motor of not only the third cutting unit 84 but also the wing cutting units 42. There is a further connection to each forward lifting ram 52.

In another configuration, the frame 74 mounted on the tractor three point linkage may support two further cutting units, positioned outwardly of the forward cutting units 42 so as to provide a five gang grass cutting machine.

This invention has been described by way of example and numerous modifications can be made without departing from the scope of the invention. Thus, the use of support arms which are pivoted to a frame part forwardly of the front axle may be of benefit even where the pivot axes are transverse, rather than inclined as in the described embodiment. Althernatively, the pivot axes may be inclined to the transverse direction in a vertical rather than in a horizontal plane. Whilst the described usage has particular advantages when cutting units are to be brought to a transport position - in that the units are brought closer inboard than would otherwise be possible and are inclined forwardly to improve access - the benefits of reduced under-chassis space requirements may also apply when no transport position, as such, is required.

I claim:

1. A grass cutting attachment comprising a frame adapted for fixed mounting to a tractor with a frame part positioned fowardly of the tractor front axle; two support arms each pivotally mounted at one end thereof to the frame part at a location therein forwardly of the tractor front axle and carrying at the other end a cutting unit, the support arms extending rearwardly past the tractor front axle to position the associated cutting units between front and rear tractor wheels, the arrangement being such that pivotal movement of each support arm relative to the frame effects bodily movement of the associated cutting unit from the ground.

2. A cutting attachment according to claim 1, wherein each cutting unit is pivotal with respect to the associated support arm about an axis which in a cutting position lies in the direction of movement of the tractor such that, after lifting of the cutting unit through pivotal movement of the support arm, rotation of the cutting unit about said axis serves to bring the cutting unit to a transport position of reduced overall width.

3. A cutting attachment according to claim 2, wherein said axis is rearwardly and upwardly inclined in the transport position of the support arm, whereby the cutting unit is upwardly and forwardly inclined in the transport position.

4. A cutting attachment according to claim 2, wherein co-operating abutment means are provided respectively on each cutting unit and on the frame such that on continued lifting of the cutting unit through pivotal movement of the support arm, engagement between the co-operating abutment means effects said rotation of the cutting unit.

5. A cutting attachment according to claim 4, wherein said co-operating abutment means comprise at least one roller and a striking plate.

6. A cutting attachment according to claim 5, in which said striking plate has a curved surface for engagement with said roller.

7. A cutting attachment according to claim 1, wherein the pivotal mounting of each support arm to the frame part comprises a pivotal bearing axis which is inclined to the transverse direction such that pivotal movement of the support arm serves to move the cutting unit both upwardly and inwardly of the tractor.

8. A cutting attachment according to claim 7, wherein the pivotal bearing axis is inclined in a horizontal plane forwardly and outwardly with a respect to the frame part.

9. A cutting attachment according to claim 1, wherein each support arm is bowed so as substantially to pass over the associated tractor front wheel.

10. A cutting attachment according to claim 1, wherein co-operating locking means are provided on each cutting unit and the frame part releasably to hold the cutting unit in a lifted position.

* * * * *